(12) United States Patent
Chen et al.

(10) Patent No.: US 10,909,047 B2
(45) Date of Patent: Feb. 2, 2021

(54) FLASH MEMORY CONTROL DEVICE CAPABLE OF DETECTING TYPE OF INTERFACE AND METHOD THEREOF

(71) Applicant: RayMX Microelectronics, Corp., Anhui Province (CN)

(72) Inventors: Cheng-Yu Chen, New Taipei (TW); Chih-Ching Chien, Hsinchu County (TW)

(73) Assignee: RAYMX MICROELECTRONICS CORP., Hefei (CN)

( * ) Notice: Subject to any disclaimer, the term of this patent is extended or adjusted under 35 U.S.C. 154(b) by 83 days.

(21) Appl. No.: 16/382,293

(22) Filed: Apr. 12, 2019

(65) Prior Publication Data

US 2019/0236036 A1    Aug. 1, 2019

Related U.S. Application Data

(63) Continuation-in-part of application No. 16/243,748, filed on Jan. 9, 2019, now Pat. No. 10,817,437, which (Continued)

(30) Foreign Application Priority Data

Jun. 1, 2016    (TW) ............................. 105117275 A

(51) Int. Cl.
*G06F 13/10*        (2006.01)
*G06F 13/42*        (2006.01)
(Continued)

(52) U.S. Cl.
CPC ........ *G06F 13/102* (2013.01); *G06F 13/1689* (2013.01); *G06F 13/382* (2013.01);
(Continued)

(58) Field of Classification Search
CPC .. G06F 13/102; G06F 13/1689; G06F 13/382; G06F 13/4282; G06F 2213/0026; G06F 2213/0032
See application file for complete search history.

(56) References Cited

U.S. PATENT DOCUMENTS 7,237,054 B1 *   6/2007   Cain ..................... G06F 3/0617
                                                               710/107
7,664,902 B1     2/2010   Chow et al.
(Continued)

FOREIGN PATENT DOCUMENTS

CN    201153336 Y    11/2008
CN    104516802 A    4/2015

OTHER PUBLICATIONS

PCI express M.2 specification, Nov. 27, 2012, p. 150, PCI-SIG.
(Continued)

*Primary Examiner* — Nimesh G Patel
(74) *Attorney, Agent, or Firm* — McClure, Qualey & Rodack, LLP

(57) ABSTRACT

The present invention discloses a solid state drive (SSD) control device including: a multi-interface compatible physical layer circuit operable to generate a physical layer output signal according to a serializer/deserializer (SerDes) reception signal; and a processing circuit operable to make the solid state drive control device adapt to one of several interface types in accordance with the physical layer output signal.

16 Claims, 8 Drawing Sheets

Related U.S. Application Data is a continuation of application No. 15/602,787, filed on May 23, 2017, now Pat. No. 10,198,368.

(51) Int. Cl.
G06F 13/16 (2006.01)
G06F 13/38 (2006.01)

(52) U.S. Cl.
CPC .. *G06F 13/4282* (2013.01); *G06F 2213/0026* (2013.01); *G06F 2213/0032* (2013.01)

(56) References Cited

U.S. PATENT DOCUMENTS

| | | | |
|---|---|---|---|
| 8,043,099 B1 | 10/2011 | Ni et al. | |
| 9,287,669 B2 | 3/2016 | Wu et al. | |
| 9,460,042 B2 | 10/2016 | Iskandar et al. | |
| 9,552,316 B2* | 1/2017 | Desimone | G06F 13/4282 |
| 9,946,681 B1* | 4/2018 | Jenkins | G06F 13/387 |
| 2009/0300259 A1 | 12/2009 | Luo et al. | |
| 2011/0202790 A1 | 8/2011 | Rambo et al. | |
| 2011/0239009 A1 | 9/2011 | Noda | |
| 2012/0233386 A1* | 9/2012 | Tong | G06F 3/0659 711/103 |
| 2014/0047287 A1* | 2/2014 | Lee | G11C 29/10 714/719 |
| 2014/0047288 A1 | 2/2014 | Lee et al. | |
| 2015/0039787 A1* | 2/2015 | Voorhees | G06F 3/0604 710/17 |
| 2015/0067226 A1 | 3/2015 | Iskandar et al. | |
| 2015/0244119 A1 | 8/2015 | Wu et al. | |
| 2018/0210517 A1* | 7/2018 | Yun | G06F 1/187 |

OTHER PUBLICATIONS

Serial ATA international organization serial ATA revision 3.3, Feb. 2, 2016, pp. 1-2 and pp. 214-215, Serial ATA.

CN Office Action dated May 23, 2019 in Chinese application (No. 201610395495.1).

* cited by examiner

FLASH MEMORY CONTROL DEVICE CAPABLE OF DETECTING TYPE OF INTERFACE AND METHOD THEREOF

CROSS-REFERENCE TO RELATED APPLICATIONS

The present application is a Continuation-in-part of U.S. patent application Ser. No. 16/243,748 filed Jan. 9, 2019, now U.S. Pat. No. 10,817,437, which is a Continuation of U.S. patent application Ser. No. 15/602,787 filed May 23, 2017 now U.S. Pat. No. 10,198,368, which claims the benefit of priority to TW Patent Application No. 105117275, filed on Jun. 1, 2016; the disclosure of which is expressly incorporated herein by reference.

BACKGROUND OF THE INVENTION

1. Field of the Invention

The present invention relates to interface detection technique, especially to a memory control device and method capable of detecting the type of an interface.

2. Description of Related Art

A conventional solid state drive (SSD) interface is a Serial Advanced Technology Attachment (SATA) interface. However, since the transmission speed of a SATA interface gradually falls behind with the development of high speed transmission technology, some SSD uses a Peripheral Component Interconnect Express (PCI-Express) interface instead.

In order to increase compatibility, some SSD is made to support both a SATA interface and a PCI-Express interface. This kind of SSD sets the voltage level of a specific pin, so that a host is operable to detect the voltage level of the pin and appoint the configuration of a port connected to the SSD accordingly. However, after the host finishes the configuration of the port, if the operation mode of the SSD is changed from a first mode (e.g., SATA mode) to a second mode (e.g., a PCI-Express mode), or if the SSD is replaced by another SSD merely in support of the second mode, the host won't be aware of such change or replacement and won't change the configuration adaptively; as a result, the SSD or the another SSD won't be able to establish or keep a normal link between itself and the host. There is another case that the above-mentioned SSD operates under a predetermined mode (e.g., the foresaid first or second mode) by setting of the voltage level of the pin; however, a host connected to the SSD is incapable of detecting the pin while a port configuration appointed by the host for connecting the SSD is not compatible to the predetermined mode, and thus the SSD is not able to be linked up with the host normally.

People who are interested in the prior art may refer to the following literatures:
(1) "PCI Express M.2 Specification", Revision 0.7, Version 1.0, Nov. 27, 2012, PP. 150 (pin 69 PEDET).
(2) "Serial ATA Revision 3.3", Gold Revision, Feb. 2, 2016, PP. 214 (pin position 69 [Config_1]) & PP. 215 (Table 27).

SUMMARY OF THE INVENTION

In consideration of the problems of the prior art, an object of the present invention is to provide a solid state drive (SSD) control device and method capable of executing interface detection by a device side, so as to make improvements over the prior art.

The present invention discloses an SSD control device compatible to multiple types of interface. An embodiment of the SSD control device compatible to multiple types of interface. the SSD control device comprises: a multi-interfaces compatible physical layer circuit configured to receive a differential signal from the host, the multi-interface compatible physical layer circuit comprising: a level detector to detect a level of the differential signal from the host to generate a level detecting signal; and a counter, coupled to the level detector, to counting the differential signal according to the a level detecting signal to generate a counting value which indicates that the differential signal complies with one of the multiple types of interface; and a processing circuit configured to receive the counting value from the multi-interface compatible physical layer circuit, and to adapt an operation mode of the apparatus to one of the multiple types of interface in accordance with the counting value.

The present invention also discloses an SSD control method. An embodiment of the control method is carried out by a solid state drive (SSD) control device. The control method allows the SSD control device to be compatible to multiple types of interface. The control method comprises: receiving a differential signal from a host, wherein a frequency of the differential signal is higher than hundreds of KHz; detecting at least two of characteristics of the differential signal to determine the differential signal complies with one of the multiple types of interface; generating a physical layer output signal according to a detected result; and adapting an operation mode of the SSD control device to one of the multiple types of interface in accordance with the physical layer output signal.

The present invention also discloses an SSD control method. The control method allows the SSD control device to be compatible to multiple types of interface. The control method comprises: receiving a differential signal from a host, wherein a frequency of the differential signal is higher than hundreds of KHz; detecting a level of the differential signal to generate a level detecting signal within a time period; counting a pulse of the differential signal according to the level detecting signal to generate a counting result within the time period; and adapting an operation mode of the SSD control device to one of the multiple types of interface in accordance with the counting result.

These and other objectives of the present invention will no doubt become obvious to those of ordinary skill in the art after reading the following detailed description of the exemplary embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present disclosure includes a solid state drive (SSD) control device and method. The solid state drive (SSD) includes a SSD control device and at least one non-volatile memory (NVM), e.g. Flash Memory. On account of that some element of the SSD control device could be known, the detail of such element will be omitted provided that the present disclosure is still in compliance with the written description and enablement requirements. In addition, the SSD control method can be in the form of firmware and/or software which can be carried out by the SSD control device of the present invention or the equivalent thereof.

Figure 1:
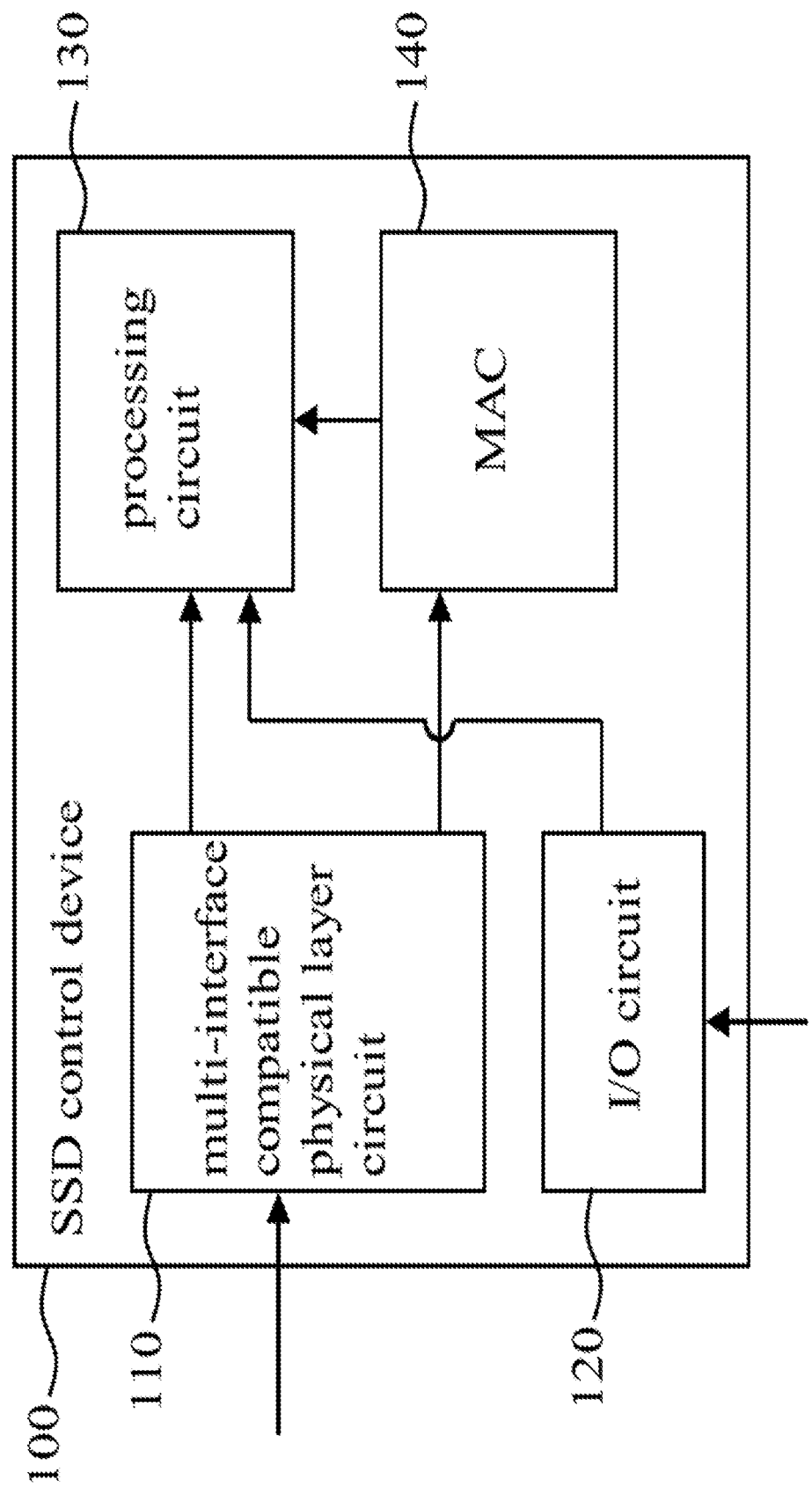
FIG. 1 illustrates an embodiment of the SSD control device of the present invention.

Please refer to FIG. 1. FIG. 1 illustrates an embodiment of the SSD control device of the present invention. The SSD control device 100 of FIG. 1 is compatible to multiple types of interface, and includes the physical layers and protocol layers of the multiple types of interface. Each of the protocol layers, such as a data link layer and a data transaction layer, is above a physical layer. The multiple types of interface are a type of Peripheral Component Interconnect Express (PCI-Express) interface, a type of Serial Advanced Technology Attachment (SATA) interface, a type of Universal Serial Bus (USB) interface etc.; however, these types of interface are examples for understanding, not for limiting the scope of the present invention.

As shown in FIG. 1, the SSD control device 100 comprises: a multi-interface compatible physical layer circuit 110, an input/output (I/O) circuit 120, a processing circuit 130, and a media access control (MAC) circuit 140. The Please refer to FIG. 1. The multi-interface compatible physical layer circuit 110 includes the physical layers of the aforementioned multiple types of interface, and is configured to output a physical layer output signal in accordance with a reception signal. In this embodiment, the reception signal is a serializer/deserializer (SerDes) reception signal. Since SerDes technology is well known in this industrial field and capable of converting a single-ended bus signal of large bit width into one or more differential signal(s) of the frequency higher than the frequency of the single-ended bus signal, the SerDes reception signal should be deemed well defined rather than undefined to those of ordinary skill in the art. It should be noted that the implementation of the present invention is not limited to SerDes technology.

Please refer to FIG. 1. The I/O circuit 120 is configured to generate at least one terminal output signal according to signal variation of at least one terminal (e.g., at least one pin). In this embodiment, the amount of the at least one terminal is equal to the amount of the at least one terminal output signal; more specifically, N different terminal output signals will be transmitted through N different terminals respectively, in which N is an integer greater than one. In addition, the at least one terminal output signal in this embodiment is transmitted without passing through the physical layer circuit 110; in other words, the SSD control device 100 separately receives the at least one terminal output signal and the SerDes reception signal through different pins.

Please refer to FIG. 1. The processing circuit 130, coupled to a non-volatile memory (NVM) (not shown in FIG. 1), could be a microprocessor or the equivalent thereof, and is configured to adapt an operation mode of the SSD control device 100 to one of the aforementioned multiple types of interface according to at least one of the physical layer output signal and the at least one terminal output signal (i.e., according to the physical layer output signal and/or the at least one terminal output signal). The operation of the processing circuit 130 will be explained in later paragraphs in detail.

Please refer to FIG. 1. The MAC circuit 140 is coupled with the physical layer circuit 110 and the processing circuit 130, and is configured to provide an addressing function and a function of access control. Although the MAC circuit 140 is necessary for the SSD control device 100, it is not directly involved with the implementation of the present invention.

Figure 2:
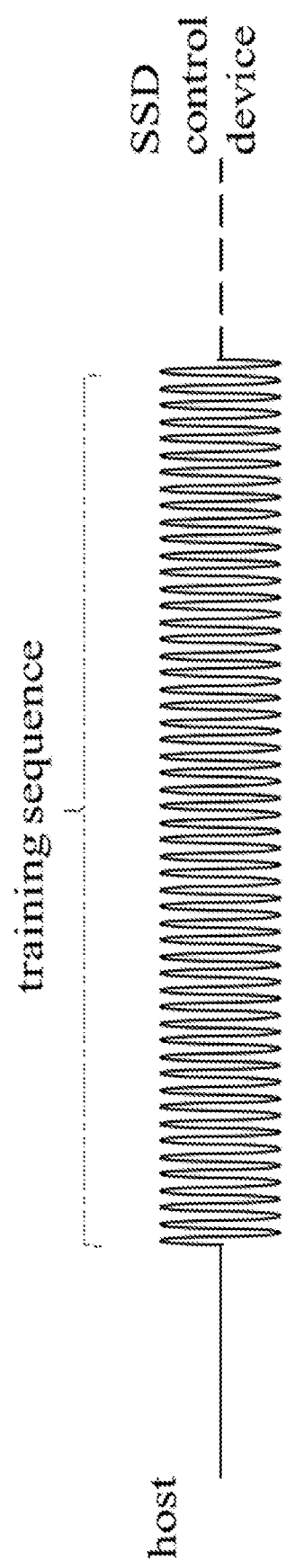
FIG. 2 illustrates the present invention detecting the SerDes reception signal complying with a specification of PCI-Express.
Figure 3:
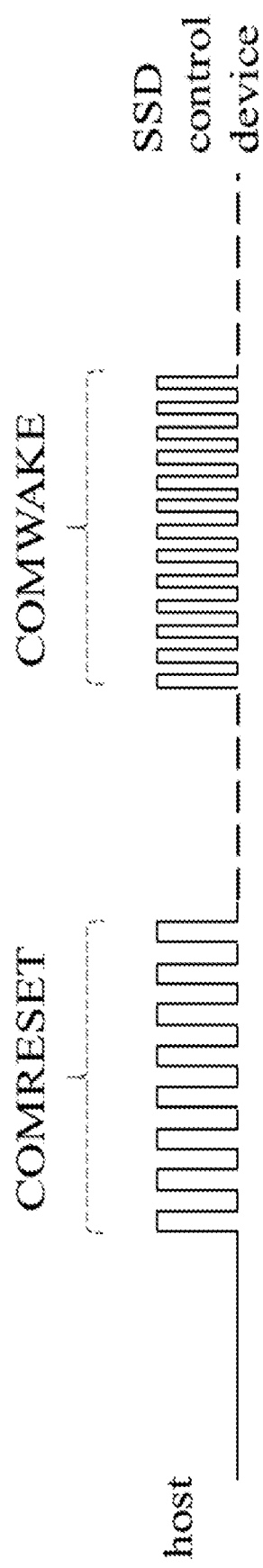
FIG. 3 illustrates the present invention detecting the SerDes reception signal complying with a specification of SATA.
Figure 4:
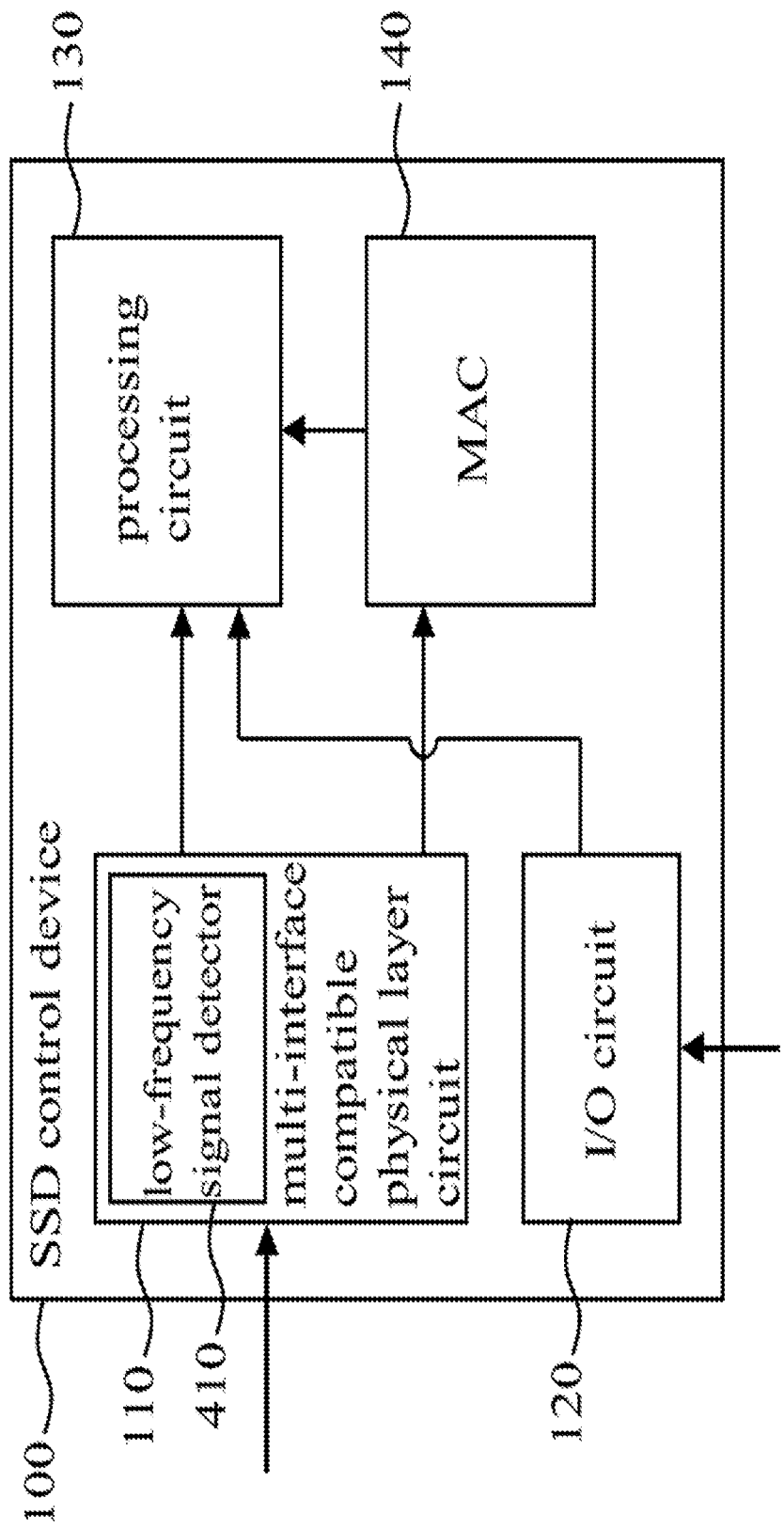
FIG. 4 illustrates another embodiment of the SSD control device of the present invention.

On the basis of the above, in an embodiment the processing circuit 130 determines the operation mode of the SSD control device 100 according to the physical layer output signal. For instance, the SSD control device 100 is compatible to both a SATA interface and a PCI-Express interface. If a host appoints a port connected to the SSD control device 100 as a port of SATA or PCI-Express interface, since the characteristic of a transmission signal of a SATA interface during its link establishment stage is different from the characteristic of a transmission signal of a PCI-Express interface during its link establishment stage, the SSD control device 100 is capable of recognizing the configuration of the port by detecting the characteristic of the transmission signal from the host, and accordingly chooses a mode for operation. In detail, if the said host transmits a SerDes signal complying with a specification of PCI-Express during a link establishment stage, the SerDes signal will be an in-band signal of a frequency complying with the PCI-Express specification, e.g., a training sequence of a frequency being 2.5 GHz as shown in FIG. 2; therefore, the physical layer circuit 110 will generate the aforementioned physical layer output signal according to the in-band signal so that the processing circuit 130 can determine whether the physical layer output signal complies with the specification of PCI-Express according to at least one of the following means: comparison with respect to signal frequency, detection of signal voltage level change, detection of the average of signal voltage level, etc. On the other hand, if the said host transmits a SerDes signal complying a specification of SATA during a link establishment stage, the SerDes signal will be an out-of-band (OOB) signal of a frequency complying with the SATA specification, e.g., a COMRESET, COMINIT, or COMWAKE signal of a low frequency as shown in FIG. 3; wherein the COMRESET, COMINIT, or COMWAKE signal includes a burst signal and a specific period of intermittent burst-idle, respectively. Therefore the physical layer circuit 110 will use a low-frequency signal detector (LFD) 410 as shown in FIG. 4 to generate the aforementioned physical layer output signal according to the low-frequency OOB signal, and thus the processing circuit 130 can determine whether the physical layer output signal complies with the specification of SATA accordingly. It should be noted that the frequency of the said in-band signal (e.g., several GHz) is generally higher than the frequency of the OOB signal. It should also be noted that the SSD control device 100 is able to transmit signals to the aforementioned host; however, this operation has little to do with the feature of the present embodiment, and thus the detail is omitted.

Figure 5:
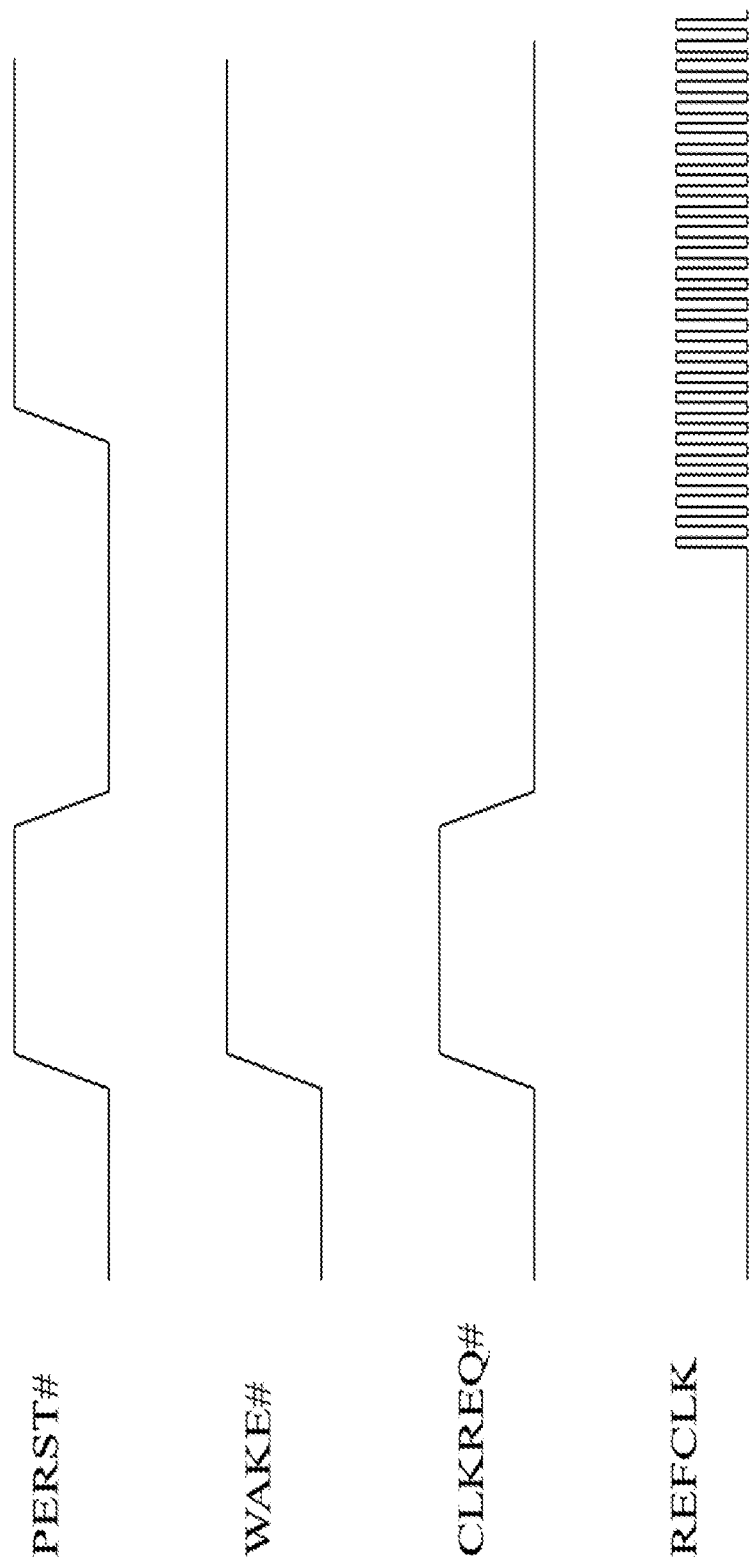
FIG. 5 shows a waveform diagram of a terminal output signal complying with a specification of PCI-Express.

In another embodiment, the processing circuit 130 determines the operation mode of the SSD control device 100 according to the at least one terminal output signal. For instance, the SSD control device 100 is compatible to both a SATA interface and a PCI-Express interface. If a host appoints a port connected to the SSD control device 100 as a port of SATA or PCI-Express interface, since the signal transmission of a SATA interface does not require the at least one terminal output signal while the signal transmission of a PCI-Express interface requires the at least one terminal output signal, the at least one terminal output signal through the SATA interface will be kept unchanged while the at least one terminal output signal through the PCI-Express interface will change by a specific pattern, and thus the SSD control device 100 can recognize the configuration of the port by receiving and detecting the transmission signal from the host through the aforementioned at least one terminal, and thereby choose a mode for operation. In detail, if the at least one terminal output signal complies with a specification of PCI-Express, the at least one terminal output signal could be, for example, a side-band signal including at least one of a reset signal (PERST#), a wake-up signal (WAKE#), a clock request signal (CLKREQ#) and a reference clock signal, in which the symbol "#" stands for "low enable" (i.e., a low level of a signal indicating an enabled state). After the SSD control deice 100 is connected with a host, the waveforms of the reset signal, the wake-up signal, the clock request signal and the reference clock signal are shown in FIG. 5. Accordingly, the processing circuit 130 can find out the foresaid port is appointed as a port of a PCI-Express interface according to at least one of the following means: comparison with respect to signal frequency, detection of signal voltage level change, detection of the average of signal voltage level, etc. However, if the port is appointed as a port of a SATA interface, the waveform of the at least one terminal output signal won't change, and thereby the processing circuit 130 can find out that the at least one terminal output signal does not comply with a specification of PCI-Express and then determine that the SSD control device 100 should operate under a SATA mode.

Please refer to FIG. 5. In an embodiment, the processing circuit 130 detects whether the level of the reset signal is pulled high, and afterwards detects whether "the level of the reset signal is pulled down by a host terminal and thereby asserted", so as to generate a detection result, determine that the at least one terminal output signal complies with a specification of PCI-Express when the detection result is affirmative, and determine that the at least one terminal output signal does not comply with the specification of PCI-Express when the detection result is negative. In another embodiment, the processing circuit 130 detects whether the level of the clock request signal is pulled high, and afterwards detects "whether the level of the clock request signal is pulled down by the SSD control device 100 and thereby asserted", so as to generate a detection result, determine that the at least one terminal output signal complies with a specification of PCI-Express when the detection result is affirmative, and determine that the at least one terminal output signal does not comply with the specification of PCI-Express when the detection result is negative. In a further embodiment, the processing circuit 130 detects the level variation of the clock request signal and detects whether the reference clock signal exists, so as to determine that the at least one terminal output signal complies with a specification of PCI-Express when the level variation and the existence of the clock request signal are affirmative; in this embodiment, the SSD control device 100 comprises a clock generating circuit (not shown in the figures) configured to generate an operation clock according to the reference clock signal (e.g., a clock signal of 100 MHz) from a host, so that the SSD control device 100 can operate under a PCI-Express mode according to the operation clock; it should be noted that a specification of SATA adopts an embedded clock signal and thus the above-mentioned independent reference clock signal is not necessary here. In a further embodiment, the processing circuit 130 detects whether the level of at least one of the reset signal, the wake-up signal and the clock request signal is pulled high, so as to generate a detection result, determine that the at least one terminal output signal complies with a specification of PCI-Express when the detection result is affirmative, and determine that the at least one terminal output signal does not complies with the specification of PCI-Express when the detection result is negative.

Figure 6:
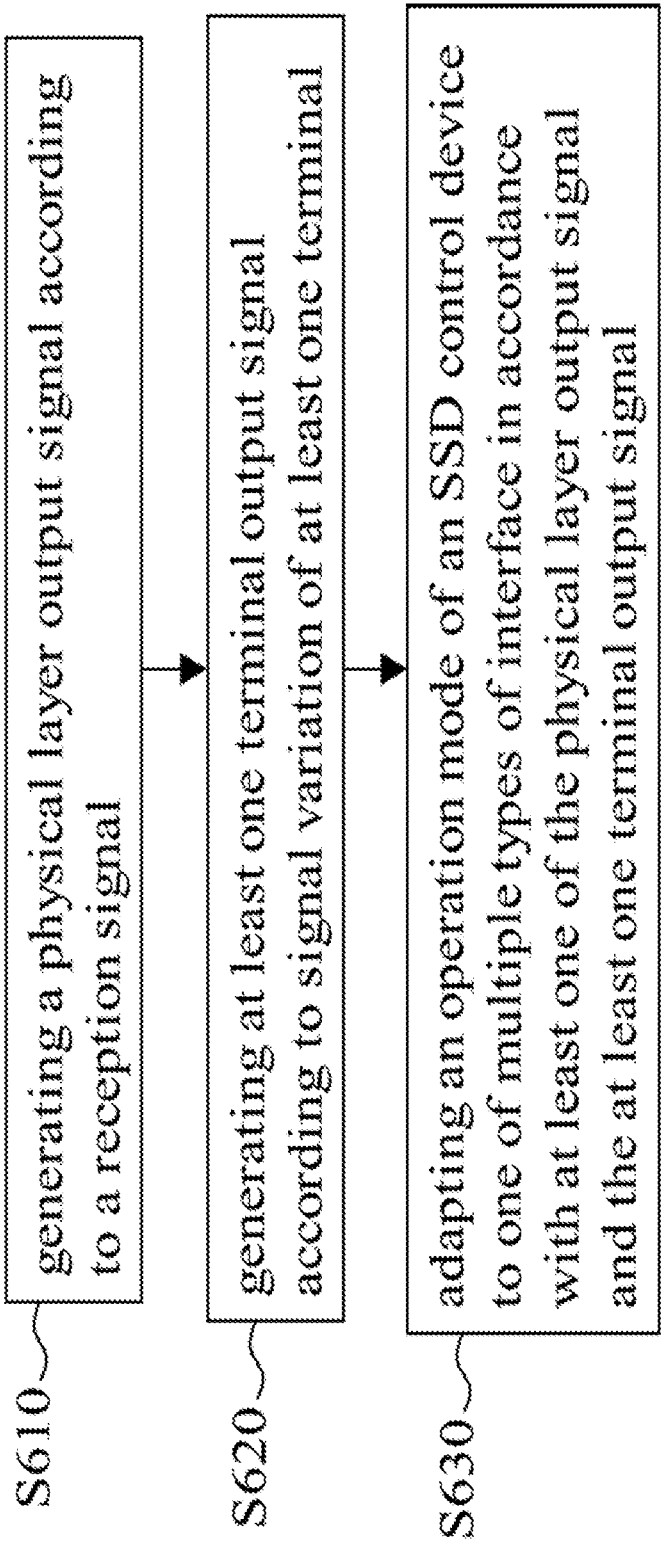
FIG. 6 illustrates an embodiment of the SSD control method of the present invention.

In addition to the fore-disclosed SSD control device 100, the present disclosure further includes an SSD control method that is carried out by the aforementioned SSD control device 100 or the equivalent thereof. An embodiment of the control method is shown in FIG. 6 and capable of adapting an SSD control device to multiple types of interface, and comprises the following steps:

Step S610: generating a physical layer output signal according to a reception signal. This step can be executed by the multi-interface compatible physical layer circuit 110 of FIG. 1 or the equivalent thereof.

Step S620: generating at least one terminal output signal according to signal variation of at least one terminal. This step can be executed by the I/O circuit 120 of FIG. 1 or the equivalent thereof.

Step S630: adapting an operation mode of the SSD control device to one of the multiple types of interface in accordance with at least one of the physical layer output signal and the at least one terminal output signal. This step can be executed by the processing circuit 130 of FIG. 1 or the equivalent thereof.

Figure 8:
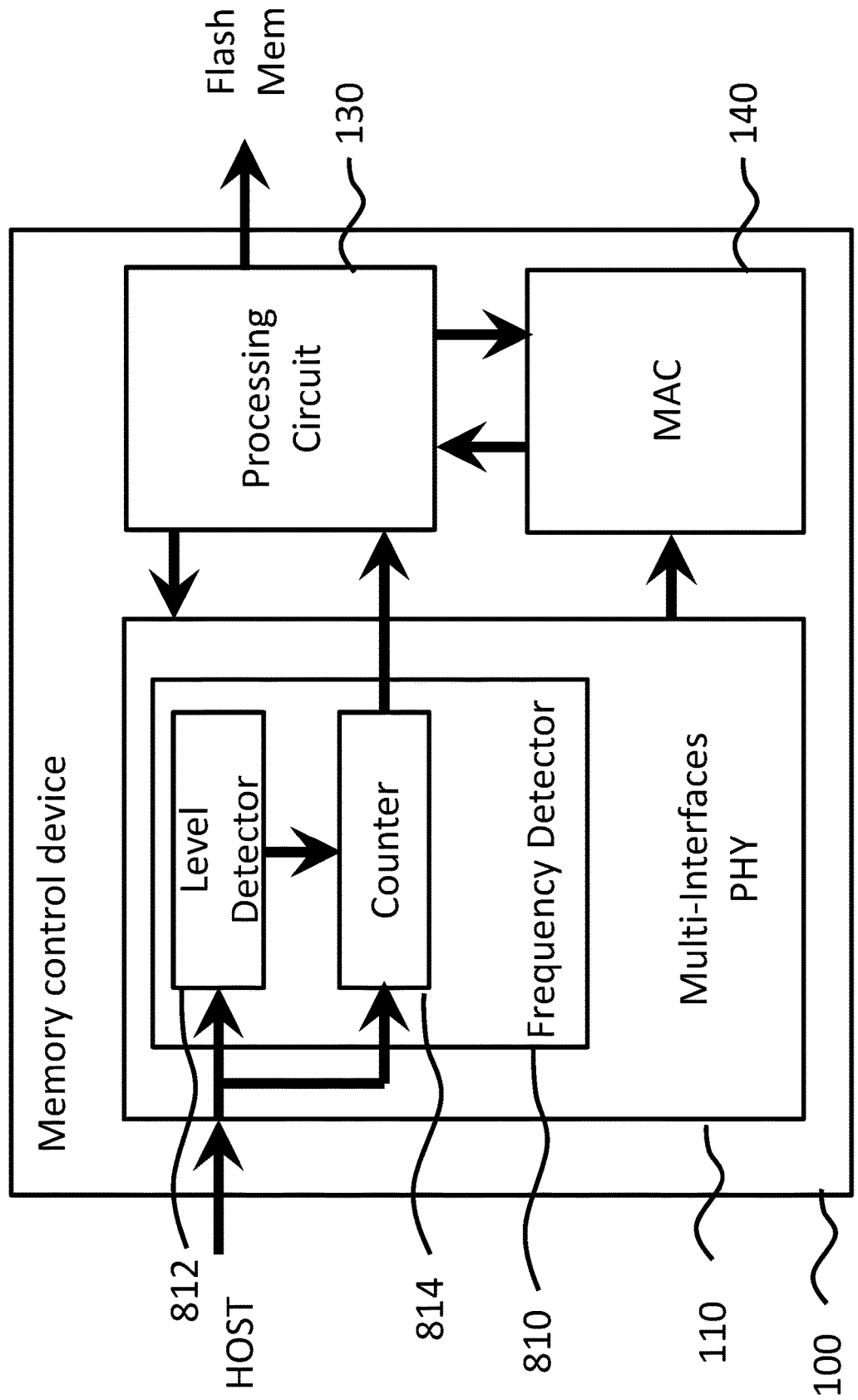
FIG. 8 illustrates another embodiment of the SSD control device of the present invention.

Please refer to FIG. 8. FIG. 8 illustrates an embodiment of the SSD control device 100 of the present invention. In an embodiment, the frequency detector (FD) 810 comprises a level detector 812 and a counter 814. The level detector 812 receives the SerDes reception signal and detects the voltage level of the SerDes reception signal from the host to control the counter 814 according to the level detected result.

The counter 814 is electrically coupled to the level detector 812. The counter 814 counts a pulse of the SerDes reception signal according to the control (start/stop) of the level detector 812, and generating a counting value, wherein the counting value is corresponding to the frequency of the SerDes reception signal. Finally, the Multi-interfaces PHY 110 outputs the physical layer output signal including the counting value to the processing circuit 130.

Second Embodiment

Due to the convenience of the USB interface, an external device (for example, an external SSD device) can also transmit data to and from a host through a USB interface. In a second embodiment, the SSD control device 100 supports a USB interface (for example, USB 3.x) and a PCI-Express interface. For instance, the SSD control device 100 is compatible to both a USB interface and a PCI-Express interface. If a host appoints a port connected to the SSD control device 100 as a port of USB3.x or PCI-Express interface, since the characteristic of a transmission signal of a USB3.x interface during its link establishment stage is different from the characteristic of a transmission signal of a PCI-Express interface during its link establishment stage, the SSD control device 100 is capable of recognizing the configuration of the port by detecting the characteristic of the transmission signal from the host, and accordingly chooses a mode for operation. In detail, if the host transmits a SerDes signal complying with a specification of PCI-Express during a link establishment stage, the SerDes signal will be an in-band signal of a frequency complying with the PCI-Express specification, e.g., a training sequence of a frequency being 2.5 GHz as shown in FIG. 2; therefore, the physical layer circuit 110 will generate the aforementioned physical layer output signal according to the in-band signal so that the processing circuit 130 can determine whether the physical layer output signal complies with the specification of PCI-Express according to at least one of the following means: comparison with respect to signal frequency, detection of signal voltage level change, detection of the average of signal voltage level, etc.

Figure 7:
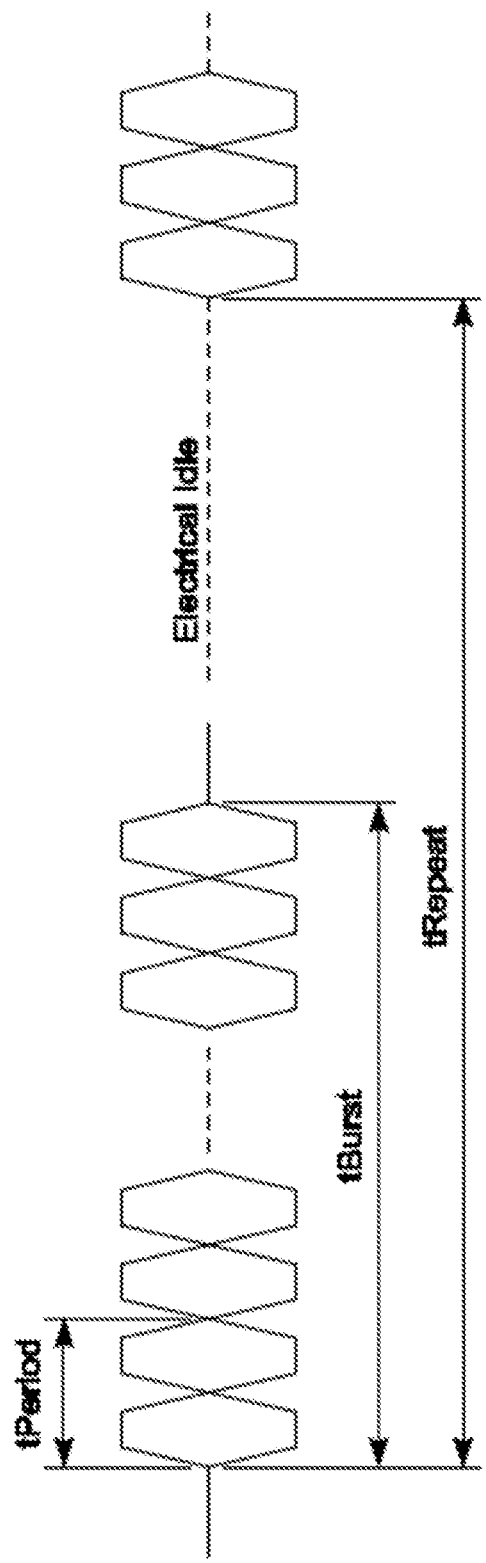
FIG. 7 illustrates the present invention detecting the SerDes reception signal complying with a specification of USB3.x.

On the other hand, if the said host transmits the SerDes signal complying a specification of USB3.x during a link establishment stage, the SerDes signal will be an out-of-band (OOB) signal of a frequency complying with the USB3.x specification, e.g., a Low Frequency Periodic Signaling (LFPS) signal. The LFPS signal includes a burst signal pattern and a specific period of intermittent burst-idle signal pattern as shown in FIG. 7; therefore the physical layer circuit 110 will use a frequency detector (FD) 810 as shown in FIG. 8 to generate the aforementioned physical layer output signal according to the low-frequency OOB signal, and thus the processing circuit 130 can determine whether the physical layer output signal complies with the specification of USB3.x accordingly. It should be noted that the frequency of the said in-band signal (e.g., several GHz) is generally higher than the frequency of the LFPS signal. It should also be noted that the automatic detecting principle of first and second embodiment are similar, the SATA interface and the USB interface are still different. Therefore, the physical layer circuit and MAC circuit for the USB3.x specification and the physical layer circuit of the MAC circuit for SATA specification are different circuit.

Third Embodiment

In the third embodiment, the SSD control device 100 can support a SATA interface, a PCI-Express interface, and an USB3.x interface. As can be seen from the description of the above embodiment, if the host transmits a SerDes signal complying with the PCI-Express specification during the connection establishment phase, the SerDes signal will be a signal in-band (In-Band) signal whose frequency meets the specification definition, for example, A training sequence with a frequency of 2.5 GHz is shown in FIG. 2, so the physical layer circuit 110 generates the physical layer output signal according to the signal in the frequency band, so that the processing circuit 130 compares and estimates the signal frequency. At least one of the detection of the bit change, the detection of the average value of the level, etc., to determine that the physical layer output signal complies with the PCI-Express specification; and if the host transmits the SerDes signal complying with the USB3.x specification or the SATA specification during the connection establishment phase, the SerDes signal is an Out-of-Band (OOB) signal whose frequency is lower than the specification, and the frequency detecting circuit (FD) 810 of the physical layer circuit 110 detects The out-of-band signal indicates that the SerDes signal is complying with the USB3.x specification or the SATA specification.

When the counting value of the physical layer output signal is higher than a high predetermined threshold, the counting value indicates that the SerDes signal is a signal in-band (In-Band) signal; the processing circuit 130 determines that the SerDes signal complies with the PCI-Express specification. When the counting value of the physical layer output signal is between a low predetermined threshold and the high predetermined threshold, the physical layer output signal indicates the SerDes signal complies with the SATA specification. When the counting value is less than the low predetermined threshold, the processing circuit 130 can determine that the SerDes signal is LPFS signal and complies with the USB3.x specification.

In another embodiment, the processing circuit 130 further includes a time configured to generate a time period for timeout. If the processing circuit 130 cannot determine whether the SerDes signal does not comply with the PCI-E, SATA, and USB3.x specifications within the time period, the processing circuit 130 will communicate with the host according to USB2.0 specification. In an embodiment, the processing circuit 130 does not receive the counting value within the time period (or the counting value is zero), the processing circuit 130 will adapt a USB2.0 operation mode of the control device 100 to communicate with the host according to USB2.0 specification. In an embodiment, the time period is not smaller than 200 msec.

When the processing circuit 130 determines that the SerDes signal from the host complies with one of the PCI-E, SATA, and USB specifications, the processing circuit 130 can control the physical layer circuit 110 and the MAC circuit 140 to process the SerDes signal according to one of the PCI-E, SATA, and USB3.x specifications, and receives a processed signal which is processed by the physical layer circuit 110 and the MAC circuit 140.

Since those of ordinary skill in the art can appreciate the detail and modification of the method embodiment by referring to the description of the fore-disclosed device embodiments, which means that each feature of the device embodiments can be applied to the method embodiment in a reasonable way, therefore repeated and redundant description is omitted. It should be noted that although the most embodiments of the present disclosure take USB2.0, USB3.x, SATA and PCI-Express interfaces, people of ordinary can appreciate how to modify the SSD control device and method to make them compatible to more kinds or other kinds of interfaces according to the present disclosure and the specifications of the said other kinds of interfaces. These and other reasonable modifications pertain to the scope of the present invention.

In summary, the SSD control device and method of the present invention allow a device (in relation to a host) to carry out interface detection, which not only prevents the problems of the prior art, but also features low implementation cost and high applicability.

The aforementioned descriptions represent merely the exemplary embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A solid state drive (SSD) control device, configured to couple to a host and to access a memory block, compatible to multiple types of interface, the SSD comprising:
a multi-interface compatible physical layer circuit configured to receive a differential signal from the host, the multi-interface compatible physical layer circuit comprising:
a level detector to detect a level of the differential signal from the host to generate a level detecting signal; and
a counter, coupled to the level detector, to counting the differential signal according to the level detecting signal to generate a counting value which indicates that the differential signal complies with one of the multiple types of interface;
and
a processing circuit configured to receive the counting value from the multi-interface compatible physical layer circuit, and to adapt an operation mode of the apparatus to one of the multiple types of interface in accordance with the counting value.

2. The SSD control device of claim 1, wherein the multiple types of interface include a type of Peripheral Component Interconnect Express (PCI-Express), a type of Serial Advanced Technology Attachment (SATA) and a type of Universal Serial Bus (USB) interface.

3. The SSD control device of claim 2, wherein the differential signal includes one of an in-band signal and an out-of-band (OOB) signal, and the in-band signal complies with a specification of PCI-Express, and the OOB signal complies with a specification of USB or SATA.

4. The SSD control device of claim 3, wherein a frequency of the in-band signal is above 1 GHz.

5. The SSD control device of claim 1, wherein the processing circuit cannot determine whether the differential signal complies with the PCI-E or SATA or USB3.x specifications within a time period, the processing circuit adapts an operation mode of the apparatus to USB2.0 type of interface.

6. The SSD control device of claim 1, wherein the time period is not smaller than 200 msec.

7. The SSD control device of claim 1, wherein a frequency of the differential signal is higher than hundreds of KHz.

8. A control method carried out by a solid state drive (SSD) control device, the control method allowing the SSD control device to be compatible to multiple types of interface, the control method comprising:
receiving a differential signal from a host, wherein a frequency of the differential signal is higher than hundreds of KHz;
detecting at least two of characteristics of the differential signal to determine the differential signal complies with one of the multiple types of interface, by:
detecting a level of the differential signal to generate a detecting result; and
counting a pulse of the differential signal according to the detecting result to generate a counting result;
generating a physical layer output signal according to a detected result; and
adapting an operation mode of the SSD control device to one of the multiple types of interface in accordance with the counting result of the physical layer output signal.

9. The control method of claim 8, wherein the multiple types of interface include a type of Peripheral Component Interconnect Express (PCI-Express), a type of Serial Advanced Technology Attachment (SATA) and a type of Universal Serial Bus (USB) interface.

10. The control method of claim 9, wherein the differential signal includes one of an in-band signal and an out-of-band (OOB) signal, and the in-band signal complies with a specification of PCI-Express, and the OOB signal complies with a specification of USB or SATA.

11. The control method of claim 10, wherein a frequency of the in-band signal is above 1 GHz.

12. The control method of claim 8,
wherein if the counting result is lower than a first threshold, the differential signal complies with a specification of USB3.x;
wherein if the counting result is between the first and a second thresholds, the differential signal complies with a specification of SATA; and
wherein if the counting result is higher than the second threshold, the differential signal complies with a specification of PCI-E.

13. The control method of claim 8, wherein the differential signal is determined not to comply with the PCI-E, SATA, and USB3.x specifications within a time period, the operation mode of the apparatus is adapted to USB2.0 type interface.

14. The control method of claim 13, wherein the time period is not smaller than 200 msec.

15. The control method of claim 8, wherein a frequency of the differential signal is higher than hundreds of KHz.

16. A control method carried out by a solid state drive (SSD) control device, the control method allowing the SSD control device to be compatible to multiple types of interface, the control method comprising:
receiving a differential signal from a host, wherein a frequency of the differential signal is higher than hundreds of KHz;
detecting a level of the differential signal to generate a level detecting signal within a time period;
counting a pulse of the differential signal according to the level detecting signal to generate a counting result within the time period; and
adapting an operation mode of the SSD control device to one of the multiple types of interface in accordance with the counting result.

* * * * *